Aug. 30, 1966   G. A. SMITH, JR., ETAL   3,269,004
PROCESS OF ROLL BONDING STAINLESS STEEL AND ALUMINUM
Filed May 6, 1963
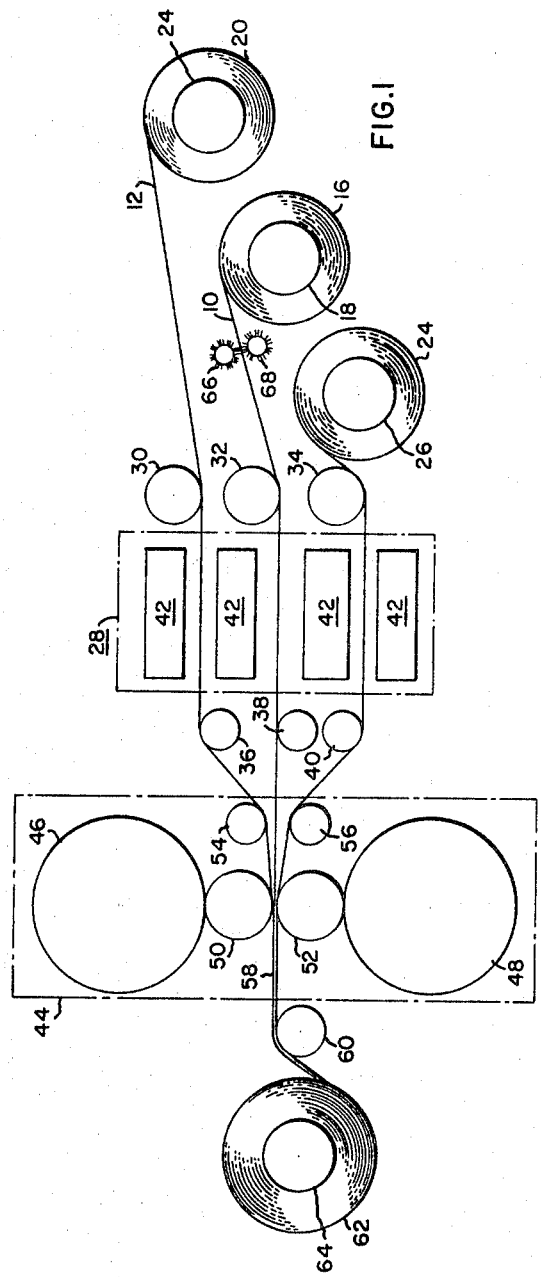
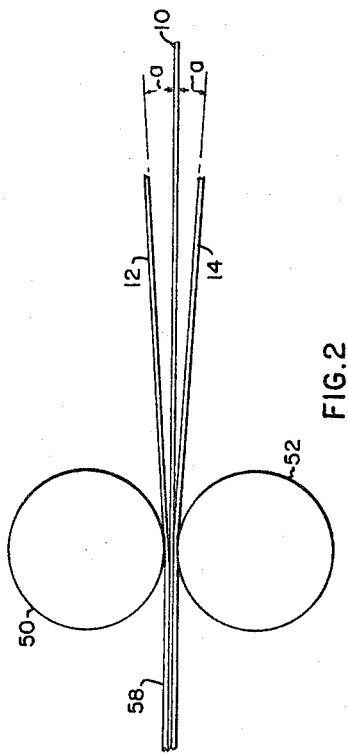
INVENTORS
GEORGE A. SMITH, JR.
JOHN H. NORTON
POUL ANDERSEN
BY *William N Hogg*
ATTORNEYS United States Patent Office 3,269,004
Patented August 30, 1966

3,269,004
PROCESS OF ROLL BONDING STAINLESS STEEL AND ALUMINUM
George A. Smith, Jr., Waterbury, and John H. Norton and Poul Andersen, Wallingford, Conn., assignors to Allegheny Ludlum Steel Corporation, Brackenridge, Pa., a corporation of Pennsylvania
Filed May 6, 1963, Ser. No. 278,199
11 Claims. (Cl. 29—471.1)

This invention relates to bonding of dissimilar metals, and more particularly to roll bonding aluminum and stainless steel strip. In even more particular aspects, this invention concerns roll bonding aluminum strip between strips of stainless steel to provide a composite structure having outstanding characteristics for use in manufacturing cookware.

In the manufacture of cookware, aluminum has been widely used because of its excellent heat transfer characteristics. However, aluminum is difficult to clean and is highly susceptible to staining. On the other hand, stainless steel has also been widely used for cookware because of its resistance to stain and the ease with which it can be cleaned. Stainless steel, however, does not have as good heat transfer characteristics as does aluminum. The recent development of a composite material wherein a strip of aluminum is bonded between two strips of stainless steel has provided the industry with a stainless steel surfaced material exhibiting heat transfer characteristics almost equal to those of commercial aluminum strip. This composite material is commonly produced by a method commonly referred to as "roll bonding," wherein a strip of aluminum is fed between two strips of stainless steel into a rolling mill wherein the roll pressure causes bonding between the aluminum and stainless steel. Since the resulting composite material must be deep drawn to form the utensils it must have certain specific physical and mechanical properties to permit such deep drawing economically without damage to the material. One of these characteristics is, of course, the existence of a bond between the aluminum and stainless steel of sufficient strength to prevent separation or delamination of the strips during the drawing operations. Also, the composite strip must be of sufficient hardness to be properly formed by deep drawing, but not so hard as to require excess energy or cause rapid die wear. These are just a few of the characteristics which a material must have to be amenable to deep drawing and there are many others well known in the art which must also be possessed by the composite strip in order for it to be suitable in the manufacture of cookware.

In non-composite material such as stainless steel individually, aluminum individually, etc., the hardness and other characteristics can normally be controlled and altered quite readily by the proper selection of heat treatments. However, this is not normally possible with composite material of a dissimilar nature such as aluminum and stainless steel, because of the different effects of any given treatment or temperature on the different materials. For example, the temperature required to anneal the fully work hardened strip of stainless steel to a suitable hardness for deep drawing is either above the melting point of the aluminum strip or sufficiently high to render the aluminum "dead soft" and unsuitable for deep drawing. This obviously precludes any annealing of the composite structure at these high temperatures after the composite structure has been formed. On the other hand, certain temperatures are detrimental to the stainless steel (e.g. the blue brittle range), so these temperatures cannot be used on the composite strip even though they might benefit the aluminum. For these reasons as well as for reasons of economy, it is desirable to produce a roll bonded composite material that leaves the rolling mill with suitable physical and mechanical characteristics to permit deep drawing with little or no subsequent treatment required.

It is therefore a principal object of this invention to provide an improved method of bonding dissimilar strip materials.

Another object of this invention is to provide a method of producing an improved composite material of aluminum and stainless steel.

Yet a further object of this invention is the provision of an improved method of bonding aluminum strip between two strips of stainless steel which produces a composite material suitable for deep drawing.

These and other objects will become apparent from the following description taken in conjunction with the accompanying drawing in which:

FIGURE 1 is a schematic representation of the roll bonding of an aluminum strip between two strips of stainless steel according to this invention; and FIG. 2 is an enlarged view of the work rolls bonding the strip together.

Referring now to the drawing, FIGURE 1 in a schematic fashion, represents the continuous roll bonding of a strip of aluminum 10 between two strips of stainless steel 12 and 14. The strip of aluminum 10 in the form of a coil 16 is mounted on a conventional uncoiler 18. The strips of stainless steel 12 and 14 are also mounted as coils 20 and 22 on uncoilers 24 and 26 respectively. Each of the uncoilers 18, 24 and 26 is provided with conventional brakes (not shown) suitable for providing back tension on the strip. The strips 10, 12 and 14 are fed through a furnace designated generally as 28 and are maintained on a given pass line by pass line rolls 30, 32 and 34 on the entrance side of the furnace, and pass line rolls 36, 38 and 40 on the exit side of the furnace. The furnace is provided with suitable baffle 42 to control the temperature of the different zones of the furnace for a purpose which will be described presently.

From the furnace 28, the strips are directed into a four-high rolling mill designated generally as 44. The rolling mill 44 has a pair of back-up rolls 46 and 48 and a pair of work rolls 50 and 52. The rolling mill 44 is also provided with an upper entry guide roll 54 under which the upper strip of stainless steel 12 is reeved and a lower entry guide roll 56 over which the lower strip of stainless steel 14 is reeved. The rolling mill 44 is provided with conventional adjusting devices to adjust the separations of the various rolls. The individual strips 10, 12 and 14 are roll bonded by pressure applied by the work rolls 50 and 52, and exit as a unitary composite strip 58 which is reeved over an exit roll 60 and then coiled as a coil 62 on a conventional recoiler 64. There is also provided between the uncoiler 18 and the pass line roll 32, upper and lower rotating wire brushes 66 and 68 which are adapted to scratch-brush the opposite surfaces of the aluminum strip to prepare it for bonding. This brushing may be done, if desired, in a separate operation before the coiled aluminum strip 16 is mounted on the uncoiler 18 although for the sake of economy this wire brushing operation should be incorporated as shown.

Although various thicknesses and grades of stainless steel may be used as well as various thicknesses and grades of aluminum, it is preferred that the 300 Series stainless steel be used, and particularly Type 304 stainless steel. For optimum cookware material, it has been found that the stainless steel strips should have a gauge of from about .010" to about .015". Various types of aluminum and aluminum alloy strip may be used but Type 3003 in a fully annealed condition is preferred. The thickness of the aluminum strip will vary depending upon the desired thickness of the final composite material, but as will become apparent hereinafter, the aluminum should be of sufficient thickness to provide a final composite material of the desired thickness with a reduction of at least 60% in the thickness of the aluminum.

It has been found that when the mill speeds are below about 30 feet per minute, sufficient heat is not generated in the bonding zone by the bonding operation and therefore the aluminum must be heated in order to insure a proper bond. (Unless otherwise noted, mill speed refers to the lineal speed of the composite strip as it exists from the rolling mill 44.) At a mill speed of about 15 feet per minute it is desired to keep the center section of the furnace 28 through which the aluminum strip 10 is passing, at a temperature of about 900° F. and the baffled sections through which the stainless steel strips 12 and 14 pass, at about 250° F. The heating of the satinless steel strip is for the purpose of insuring that it is completely free of moisture; a temperature higher than that necessary to dry the stainless steel strip should be avoided because a higher temperature tends to form an oxide coating which is detrimental to the formation of a good bond between the stainless steel and the aluminum. It is to be understood that with variations in line speed, the temperature of the furnace, especially that of the central zone, may be varied to produce the desired temperature, the exact temperature being a function of the line speed and also a function of the amount of heat generated by the bonding operation in the bonding zone. Heat at the bonding zone is necessary to provide a satisfactory bond between the aluminum and stainless steel strips and it has been found that the temperature in this zone must be quite closely controlled. In order to control this temperature, the work rolls 50 and 52 are provided with internal passages (not shown) through which cooling water is circulated. It has been found that the cooling water must be circulated at a rate to maintain the surfaces of the work roll at a temperature of from 250° F. to 400° F. If the temperature is lowered below 250° F., the rolls extract heat too rapidly from the bonding zone and a weak unsatisfactory bond results. If the temperature is allowed to rise above 400° F., a condition known as "blistering" results. These blisters are the result of voids or cavities in the aluminum, it being theorized that such voids or cavities are formed by gases during the roll bonding operation due to excessive temperatures in the bonding area. These voids manifest themselves as raised blisters on the stainless steel skin of the composite material.

It has been found that in order to obtain a satisfactory bond the thickness of the aluminum must be reduced at least 60%. This 60% reduction will also work harden the fully annealed aluminum to a degree which makes it suitable for deep drawing.

It has further been found that controlling the angle of approach of the strips to the bite of the rolls 50 and 52 is important. It is preferred that the aluminum strip 10 be fed straight into the mill normal to a plane passing through the axes of rotation of the rolls 50 and 52. For best results, the stainless steel strips 12 and 14 preferably should each be fed into the bite of the rolls 50 and 52 at an angle of between 3° and 5° with respect to the aluminum strip 10. The angle of each of the strips 12 and 14 with the strip 10 is shown in FIG. 2 as A and it is each of these angles A that should be between 3° and 5°. If angle A is greater than 5°, the work rolls tend to dissipate the heat from the bonding zone too rapidly and if angle A is less than 3° the steel strip contacts the aluminum strip in front of the bonding zone which tends to restrict any lateral movement of the strips necessary for maintaining the strips in proper lateral position. This angle can be adjusted by adjusting the rolls 54 and 56.

Controlling of the back tension on each of the strips is important for producing a satisfactory bond. It has been found that it is desirable to provide a back tension on the stainless steel strips of at least 10,000 p.s.i. and a back tension of about 6,000 p.s.i. on the aluminum strip. The back tension should be great enough to allow positive steering and control of the strips but not great enough to stretch any of the strips past their proportional limit. Stretching of the stainless steel is undesirable because this tends to work harden the stainless steel which, as pointed out above, is undesirable. Stretching of the aluminum prior to its entry into the rolling mill is undesirable since it is stretching movement or elongation at the bonding area caused by the roll pressure which promotes a successful bond and stretching by back tension reduces the amount of stretching caused by the roll pressure at this bonding area. Hence, any appreciable pre-stretching of the aluminum is to be avoided.

As was pointed out above, reduction of the stainless steel will work harden it and the more the steel is work hardened, the more difficult it is to deep draw. Minimizing the reduction of the stainless steel strips is accomplished in the present invention by providing roughened work rolls and by conducting the rolling operation free of any rolling lubricant. It has been found that about a 5% reduction in thickness of the steel is about the maximum acceptable. The work rolls must have a roughness of at least 4 microinches, R.M.S. It is preferable that the roughness not be any greater than 10 microinches, R.M.S., because rolls with a roughness any greater than this tend to impart a dull matte-like finish to the surface of the stainless steel and, for cookware applications, a more polished surface is desired. However, from a bonding standpoint, a rougher surface can be tolerated without affecting the character of the bond.

Roll surfaces which are quite suitable for practicing this invention have been prepared according to the teachings of co-pending application Serial No. 271,895, filed April 10, 1963, entitled "Method of Preparing Roll Surfaces," by John H. Norton and Joseph L. Foucalt. By the use of these roughened rolls and by rolling without the use of a rolling lubricant, the rolls will grip the surface of the stainless steel allowing the reduction in thickness to take place almost entirely in the aluminum strip. If the rolls are smooth or a rolling lubricant is used, slippage occurs between the stainless steel strip and the rolls which results in a reduction in thickness of the stainless steel strips. This, as indicated above, work hardens the strip to such a condition that it is difficult to deep draw economically.

An example is given below as illustrative of typical materials and parameters in the bonding operation which have been found to result in a good bond. This example is intended to be illustrative only and is not intended to limit the scope of the invention.

*Example*

Two stainless steel strips having a gauge of .010" were used and bonded to opposite sides of an aluminum strip having a starting gauge of .080". These strips were directed through the furnace 28 with the central zone, through which the aluminum strip passed, maintained at 900° F. and the outer zones, through which the stainless steel passed, maintained at 250° F. The aluminum strip emerged from the furnace at a temperature of about 800° F. and the stainless steel emerged free of water. The mill speed was maintained at 15 feet per minute and the entrance guide rolls were set to maintain each of the angles A at about 4°. The work rolls 50 and 52 were separated by a distance of about .05". These work rolls were finished as described in said application Serial No. 271,895, filed April 10, 1963, entitled "Method of Preparing Roll Surfaces," to a finish of about 6 microinches, R.M.S.

In the resulting composite strip each of the stainless steel strips was about .0095" thick and the aluminum core was about .031" thick. Thus, there was about a 5% reduction in the thickness of the stainless steel and a 61% reduction in the thickness of the aluminum strip. The bond obtained was an excellent bond and the composite strip was entirely suitable for deep drawing and the production of cookware. The back tension on the stainless steel strips was maintained at about 10,000 p.s.i. and at about 6,000 p.s.i. on the strip of aluminum.

It has also been found that it is best to use a strip of aluminum slightly narrower than the two strips of stainless steel. This is to prevent the rolls from picking up any aluminum should a mis-alignment occur as the strip is passing between the rolls 50 and 52. Since no rolling lubricant is used, the rolls 50 and 52 are highly susceptible to aluminum pick-up and the use of a slightly narrower aluminum strip together with proper steering of the strips will prevent, or at least substantially reduce, the possibility of roll pick-up.

Steering can be accomplished by the device described in copending application Serial No. 315,845, filed October 14, 1963, entitled "Steering Device," by Poul Andersen.

Extensive deep drawing operations have shown that when bonding of aluminum and stainless steel is accomplished according to this invention, a sufficiently strong bond is obtained without the necessity of sintering or subsequently heating the composite product. As was pointed out above, heating to elevated temperatures will result in either a "dead soft" aluminum unsuitable for deep drawing or, if the temperature is high enough, actual melting of the aluminum. Thus, the composite strip produced by this invention is quite satisfactory for deep drawing operations in the exact form it is produced from the rolling mill 44.

Although one embodiment of this invention has been shown, various adaptations and modifications may be made without departing from the spirit and scope of the appended claims.

We claim:

1. In the method of roll bonding an aluminum strip between two stainless steel strips, wherein the aluminum strip sandwiched between the two stainless steel strips is passed through a rolling mill at a lineal speed in excess of about thirty feet per minute with the rolls arranged to reduce the thickness of the aluminum strip at least 60%, the improvement which comprises, providing the rolls with a surface having a roughness of at least 4 microinches, R.M.S., and maintaining the work rolls at a temperature of between 250° F. and 400° F., said method being characterized by maintaining the rolls and strips free from any rolling lubricant.

2. In the method of roll bonding an aluminum strip between two stainless steel strips, wherein the aluminum strip sandwiched between the two stainless steel strips is passed through a rolling mill at a lineal speed in excess of about thirty feet per minute with the rolls arranged to reduce the thickness of the aluminum strip at least 60%, the improvement which comprises, providing the rolls with a surface having a roughness of at least 4 microinches, R.M.S., maintaining the work rolls at a temperature of between 250° F. and 400° F., and wire brushing both sides of the aluminum strip prior to its entry into the rolling mill, said method being characterized by maintaining the rolls and strips free from any rolling lubricant.

3. In the method of roll bonding an aluminum strip between two stainless steel strips, wherein the aluminum strip sandwiched between the two stainless steel strips is passed through a rolling mill at a lineal speed in excess of about thirty feet per minute with the rolls arranged to reduce the thickness of the aluminum strip at least 60%, the improvement which comprises, providing the rolls with a surface having a roughness of at least 4 microinches, R.M.S., maintaining the work rolls at a temperature of between 250° F. and 400° F., introducing the aluminum strip into the mill substantially normal to a plane passing through the axes of rotation of the rolls and introducing each of the stainless steel strips into the mill at an angle of from 3° to 5° with respect to the aluminum strip, said method being characterized by maintaining the rolls and strips free from any rolling lubricant.

4. The method of claim 3 wherein the stainless steel strips are from .010" thick to .015" thick.

5. In the method of roll bonding an aluminum strip between two stainless steel strips, wherein the aluminum strip sandwiched between the two stainless steel strips is passed through a rolling mill with the rolls arranged to reduce the thickness of the aluminum strip at least 60%, the improvement which comprises, providing the rolls with a surface having a roughness of from 4 to 10 microinches, R.M.S., wire brushing both sides of the aluminum strip, passing the aluminum strip through a furnace zone heated to about 900° F. and passing the stainless steel strips through furnace zones heated to about 250° F., introducing the aluminum strip into the mill substantially normal to a plane passing through the axes of rotation of the rolls and introducing each of the stainless steel strips into the mill at an angle of from 3° to 5° with respect to the aluminum strip, and maintaining the work rolls at a temperature of between 250° F. and 400° F., said method being characterized by maintaining the rolls and strips free from any rolling lubricant.

6. The method of claim 5 wherein a back tension of less than the proportional limit of the strips is maintained on each of the strips.

7. The method of claim 5 wherein a back tension of about 10,000 p.s.i. is maintained on each of the stainless steel strips and a back tension of about 6000 p.s.i. is maintained on the aluminum strip.

8. In the method of roll bonding an aluminum strip between two stainless steel strips, wherein the aluminum strip sandwiched between the two stainless steel strips is passed through a rolling mill with the rolls arranged to reduce the thickness of the aluminum strip at least 60%, the improvement which comprises, providing the rolls with a surface having a roughness of at least 4 microinches, R.M.S., maintaining the work rolls at a temperature of between 250° F. and 400° F., prior to its entry into the rolling mill, and passing the aluminum strip through a furnace zone heated to about 900° F., said method being characterized by maintaining the rolls and strips free from any rolling lubricant.

9. In the method of roll bonding an aluminum strip between two stainless steel strips, wherein the aluminum strip sandwiched between the two stainless steel strips is passed through a rolling mill with the rolls arranged to reduce the thickness of the aluminum strip at least 60%, the improvement which comprises, providing the rolls with a surface having a roughness of at least 4 microinches, R.M.S., maintaining the work rolls at a temperature of between 250° F. and 400° F., passing the aluminum strip through a furnace zone heated to about 900° F., and wire brushing both sides of the aluminum strip prior to its entry into the rolling mill, said method being characterized by maintaining the rolls and strips free from any rolling lubricant.

10. In the method of roll bonding an aluminum strip between two stainless steel strips, wherein the aluminum strip sandwiched between the two stainless steel strips is passed through a rolling mill with the rolls arranged to reduce the thickness of the aluminum strip at least 60%, the improvement which comprises, providing the rolls with a surface having a roughness of at least 4 microinches, R.M.S., maintaining the work rolls at a temperature of between 250° F. and 400° F., passing the aluminum strip through a furnace zone heated to about 900° F., introducing the aluminum strip into the mill substantially normal to a plane passing through the axes of rotation of the rolls and introducing each of the stainless steel strips into the mill at an angle of from 3° to 5° with respect to the aluminum strip, said method being characterized by maintaining the rolls and strips free from any rolling lubricant.

11. The method of claim 10 wherein the stainless steel strips are from .010″ thick to .015″ thick.

References Cited by the Examiner

UNITED STATES PATENTS

| | | | |
|---|---|---|---|
| 2,763,058 | 9/1956 | McCullough et al. | 29—497.5 X |
| 3,078,563 | 2/1963 | Gould et al. | 29—497.5 X |
| 3,165,829 | 1/1965 | Wardlaw | 29—497.5 X |

JOHN F. CAMPBELL, *Primary Examiner.*